3,660,456
STABILIZED ISOCYANATE COMPOSITION
Kenji Naito, Hiroshi Okudo, and Katsuhiko Ogino, Toyonaka, Michio Tanaka, Suita, Yoshio Kamatani, Osaka, Hiroshi Mukai, Suita, and Tatsuro Takeuchi, Ibaragi, Japan, assignors to Takeda Chemical Industries, Ltd., Osaka, Japan
No Drawing. Filed Dec. 24, 1968, Ser. No. 786,729
Claims priority, application Japan, Dec. 28, 1967, 43/84,199
Int. Cl. C07c *119/04*
U.S. Cl. 260—453 SP                 15 Claims

ABSTRACT OF THE DISCLOSURE

Organic isocyanates stabilized against deterioration or discoloration during storage by a stabilizing amount of any one of the following compounds:
(a) a substituted urea derivative of the formula X—NHCONH—Y wherein X is nitro, cyano, acetyl, chlorinated acetyl, thioacetyl, toluenesulfonyl or benzenesulfonyl and Y is hydrogen, phenyl, or n-butyl,
(b) a cyclic ureide compound selected from the group consisting of parabanic acid, barbituric acid, barbital, thiobarbital, phenobarbital, uracil, 5-methyluracil, isocyanuric acid, benzyl isocyanurate, dibenzyl isocyanurate, n-butyl isocyanurate, di-n-butyl isocyanurate, chlorisocyanurate, dichlorisocyanurate, orotic acid, orotic acid ethyl ester, orotic acid phenyl ester, butanimide, phthalimide, and o-benzoic sulfimide.
(c) a compound shown by the formulas:
$R^1CXNHR^3$
$R^2(CONHR^3)_2$
$(CONHR^3)_2$ or
$R^4SO_2NHR^3$
wherein X is O or S; $R^1$ and $R^3$, which may be the same or different, are alkyl groups having 1 to 4 carbon atoms, phenyl groups or hydrogen, and $R^4$ is an alkyl group having 1 to 4 carbon atoms or a phenyl group, said alkyl and phenyl groups which may be substituted by one or more chlorines, —$NO_2$, —CN, an alkyl having 1 to 2 carbon atoms or an alkoxy having 1 to 2 carbon atoms; and $R^2$ is a di-valent hydrocarbon residue selected from methylene, ethenylene and phenylene,
(d) sulfur and
(e) hydrogen sulfide.

This invention relates to a stabilized organic isocyanate composition, and more particularly to organic isocyanates stabilized against polymerization and coloration.

Organic isocyanates are unstable because of the high reactivity of their isocyanato groups, and have the consequent disadvantage that they are liable to be deteriorated during storage, getting discolored and giving rise to cyclic isocyanurates, dimers, oligomers and higher polymers.

Various stabilizers for incorporation in isocyanates to improve stability on storage have been proposed, such as phenols, phosphites, acyl halides, carbon dioxide, sulfur dioxide, N,N'-disubstituted thioureas and phosphorus chlorides, but none of them has given so far satisfactory stabilization effect on those isocyanates.

Our extensive study has been done to discover a compound which by addition of its small quantity, can prevent organic isocyanates from polymerisation and coloration of those isocyanates for longer than one year.

An object of the present invention is to provide a stabilized organic isocyanate composition against polymerization and coloration.

The above object can be accomplished in accordance with this invention which comprises incorporating in an organic isocyanate a small amount of any of the following stabilizers:

(a) a compound having a group represented by the formula:

A—NH—B wherein A is —CO—, —$SO_2$—, —$NO_2$ or —CN and B is —CO— or —CS—, in its chemical structure,
(b) a compound shown by the formula:

$R^1CXNHR^3$ $R^2(CONHR^3)_2$ $(CONHR^3)_2$ or $R^4SO_2NHR^3$ wherein X is O or S, $R^1$ and $R^3$ are, same or different, alkyl (e.g. methyl, ethyl, propyl, butyl, etc.), aryl (e.g. phenyl) ... both of which may be substituted for by one or more halogens, —$NO_2$, —CN, alkyl such as methyl, ethyl, or alkoxy such as methoxy, ethoxy ..., and hydrogen, $R^2$ is di-valent hydrocarbon residue such as alkylene (e.g. methylene), alkenylene (e.g. ethenylene) or arylene (e.g. phenylene) and $R^4$ is alkyl or aryl as defined in $R^1$ or $R^3$,
(c) sulfur or
(d) hydrogen sulfide.

The compounds having the group represented by the formula A—NH—B in its chemical structure include, for example, substituted urea derivatives of the formula X—NHCONH—Y, wherein X is nitro, cyano, acetyl, chlorinated acetyl, thioacetyl, toluenesulfonyl or benzenesulfonyl and Y is hydrogen, phenyl or n-butyl. Examples of compounds following under the latter formula may be represented by such compounds as nitro urea, acetyl urea, cyano urea, dichloracetyl urea, trichloracetyl urea, toluenesulfonyl ureas (e.g. toluenesulfonyl urea, 1-p-toluenesulfonyl - 3 - phenyl urea, 1-p-toluenesulfonyl-3-n-butyl urea, etc.), etc. The generic formula A—NH—B also embraces cyclic ureides such as parabanic acid, barbituric acid, barbital, phenobarbital, uracil, uracil derivatives (e.g. 5-methyluracil), isocyanuric acid, isocyanuric acid derivatives (e.g. benzyl isocyanurate, dibenzyl isocyanurate, n-butyl isocyanurate, di-n-butyl isocyanurate, chlorisocyanurate, dichlorisocyanurate), orotic acid, orotic acid ester (e.g. orotic acid ethyl ester, orotic acid phenyl ester) etc., thiourea derivatives or cyclic thioureide corresponding to the above urea derivatives or cyclic ureide, acidicimido compounds such as butanimide, phthalimide, o-benzoic sulfimide, etc., and the like.

The compounds shown by the formula $R^1CXNHR^3$ include, for example, mono-thio)-carboxylic acid amide such as formamide, acetamide, propionamide, n-butyramide, fluoroacetamide, chloroacetamide, dichloracetamide, trichloracetamide, α-cyanoacetamide, benzamide, o-chlorobenzamide, o-bromobenzamide, o-nitrobenzamide, thioformamide, thioacetamide, chlorthioacetamide, trichlorthioacetamide, thiodenzamide, etc., N-substituted mono-(thio)-carboxylic acid amide such N-butyl-o-nitrobenzamide chloraceto-N-butylamide, trichloraceto-N-butylamide, etc., mono-(thio-carboxylic acid anilide such as acetoanilide, trichloracetanilide, benzanilide, o - chlorobenzanilide, thioacetanilide, thiobenzanilide, etc.

The compounds shown by the formula $$R^2(CONHR^3)_2$$

include, for example, dicarboxylic acid amide such as malonamide, succinamide, phthalamide, maleinamide, etc., N-substituted di-(thio)-carboxylic acid amide such as N-ethylmalonamide, N-butylmalonamide, N-ethylmaleinamide, N-butylmaleinamide, etc. and dicarboxylic acid anilide such as malonanilide, maleinanilide, phthalanilide, etc.

The compounds shown by the formula $$(CONHR^3)_2$$

include, for example, oxamide, oxanilide, etc.

The compounds shown by the formula $R^4SO_2NHR^3$ include, for example, sulfonamide derivatives such as benzenesulfonamide, o- or p-toluenesulfonamide, methanesulfonamide, p-toluenesulfon-N-ethylamide, etc., sulfonanilide derivatives such as benzenesulfonanilide, o- or p-toluenesulfonanilide, etc., and the like.

The organic isocyanates to which said stabilizers are applicable include, for example, such monoisocyanates as methyl isocyanate, ethyl isocyanate, phenyl isocyanate, benzyl isocyanate, xylyl isocyanate, etc., such diisocyanates as 2,4- and 2,6-tolylene diisocyanate, o-, m- and p-phenylene diisocyanate, 4,4'-diphenylmethane diisocyanate, m- and p-dimethylbenzene-ω,ω'-diisocyanate and a mixture of m-isomer and p-isomer, 1,10-decamethylene diisocyanate, 1,6-hexamethylene diisocyanate, 1,4-cyclohexane dissocyanate, 4,4'-dicyclohexylmethane diisocyanate, 1,3- and 1,4-α,α'-diisocyanatomethyl-cyclohexane, 4,4'-biphenylene diisocyanate, 4,4'-methylene-bis-(2-methylphenyl isocyanate), 4,4' - methylene - bis - (2-methoxyphenyl isocyanate), 1,5-naphthalene diisocyanate, 4,4'-diisocyanatodiphenylether, 2,2' - bis-(4-isocyanatophenyl)-propane, etc., and such polyisocyanates as 4,4'4''-triphenylmethane triisocyanate, toluene-2,4,6-triisocyanate, etc.

Many organic isocyanates are unstable but purified dimethylbenzene-ω,ω'-diisocyanate (hereinafter referred to as XDI) is extremely unstable among them.

XDI is prepared through the phosgenation of dimethylbenzene-ω,ω'-diamine and generally purified by fractional distillation. When hydrolyzable chlorine content of XDI decreases to a degree of less than 0.01 percent by purification, the purified XDI is very liable to form a polymer. Therefore it sometimes converts to a solid polymer or to a turbid liquid containing a polymer within a few weeks. Even when no change is recognized on its appearance, the solubility in toluene begins to shift to negative side, because of a formation of polymer in VDI during storage, the formation of polymer being detachable also by infrared spectroscopy showing the increase of absorption at 1705 cm.$^{-1}$.

Various kinds of stabilizers for organic isocyanates have been proposed but none of them, according to the tests by the present inventors, has given successful result in stabilizing XDI.

But, according to the present invention, even purified XDI is successfully stabilized, and other organic isocyanates are also stabilized with addition of small quantities of the stabilizer of this invention.

In the isocyanate composition of this invention, the preferred ratio of the stabilizer hereinbefore mentioned ranges from 0.001 to 1.0, more desirably, 0.03 to 0.2% by weight relative to the isocyanate mentioned above by way of example.

Addition of the stabilizer may be made to a purified isocyanate or a crude isocyanate prior to distillation.

Experiment 1

XDI (m-isomer 70%, p-isomer 30%) prepared by phosgenating dimethylbenzene-ω,ω'-diamine and subjecting the product to repeated fractional distillation until its hydrolyzable chlorine content reaches 0.01% is redistilled. On the other hand, various stabilizers are weighed into as many 50 cc. clear colorless bottles, respectively. The distilled XDI is poured in each of the bottles and air within each bottle is replaced with nitrogen gas. The bottles are sealed and stored. Every week 1 gram each of the samples is taken out, and is dissolved in 20 milliliters of toluene to examine the solubility of each sample.

The results are as follows:

| Stabilizer | Amount (percent by weight) | Solubility in toluene after— | | | |
|---|---|---|---|---|---|
| | | 1 week | 2 weeks | 3 weeks | 4 weeks |
| This invention: | | | | | |
| Nitrourea | 0.05 | Clear | Clear | Clear | Clear. |
| Acetylurea | 0.05 | ...do | do | do | Slight turbidity. |
| Thioacetylurea | 0.05 | ...do | do | do | Clear. |
| Trichloroacetylurea | 0.05 | ...do | do | do | Do. |
| Benzenesulfonanilide | 0.05 | ...do | do | do | Do. |
| p-Toluenesulfonanilide | 0.05 | ...do | do | do | Do. |
| 1-p-toluenesulfonyl-3-phenylurea | 0.05 | ...do | do | do | Do. |
| Parabanic acid | 0.05 | ...do | do | do | Slight turbidity. |
| Butanimide | 0.05 | ...do | do | do | Do. |
| Phthalimide | 0.05 | ...do | do | do | Do. |
| o-Benzosulfimide | 0.05 | ...do | do | do | Do. |
| Barbital | 0.05 | ...do | do | do | Do. |
| Thiobarbital | 0.05 | ...do | do | do | Do. |
| Uracil | 0.05 | ...do | do | do | Do. |
| 5-methyluracil | 0.05 | ...do | do | do | Do. |
| Isocyanuric acid | 0.01 | ...do | do | do | Do. |
| n-Butyl isocyanurate | 0.05 | ...do | do | do | Clear. |
| Benzyl isocyanurate | 0.05 | ...do | do | do | Do. |
| Dichlorisocyanuric acid | 0.01 | ...do | do | do | Do. |
| Hydrogen sulfide | [1] 0.1 | ...do | do | do | Do. |
| Control: | | | | | |
| No stabilizer | | [2] | [2] | [2] | [2]. |
| Pyrogallol | 0.05 | [3] | [3] | [3] | [3]. |
| Pyrocatechol | 0.05 | [4] | [4] | [4] | [4]. |
| Guaiacol | 0.05 | [5] | [5] | [5] | [5]. |
| Triphenyl phosphite | 0.05 | [4] | [4] | [4] | [4]. |
| Phosphorus pentachloride | 0.05 | Clear | Turbidity | | |
| Benzoyl chloride | 0.05 | ...do | do | | |
| Acetyl chloride | 0.05 | ...do | Clear | Turbidity | |
| Carbon dioxide | [1] 0.1 | [6] | [6] | [6] | [6]. |
| Sulfur dioxide | [1] 0.1 | Clear | Clear | Turbidity | |
| N,N'-dibutyl thiourea | 0.05 | [7] | [7] | [7] | [7]. |

[1] Approximately.
[2] After 4 days, the composition itself is turbid and gives a number of precipitates in toluene.
[3] Turbidity after 4 days.
[4] Gelation after 2 days.
[5] Turbidity after 3 days.
[6] Gelation after 2 days.
[7] Turbidity after 2 days.

It is also to be noted that the XDI compositions containing any of the present stabilizers can be safely stored as such for a long period of time (e.g. longer than one year) without causing any polymerization nor coloring.

Experiment 2

XDI (m-isomer: 70%, p-isomer: 30%) containing 0.08% by weight of hydrolyzable chlorine, is distilled.

0.05% by weight of various stabilizers are weighed into as many 50 cc. clear colorless bottles, respectively. The distillate obtained above is poured in each of the bottles, and the air within each bottle is replaced with nitrogen gas. Every week 1 g. each of the samples is taken out and is dissolved in 20 milliliters of toluene solution and is measured.

The results are as follows.

It is also to be noted that the XDI compositions containing any of the present stabilizers can be safely stored as such for a long period of time (e.g. longer than one year) without causing any polymerization or coloring.

Experiment 3

XDI (m-isomer 70%, p-isomer 30%) containing 0.01 percent by weight of hydrolyzable chlorine shows turbidity in relatively a short period of storage. Various stabilizers are added to as many portions of this turbid XDI. The resulting mixtures are distilled again to give stable XDI compositions.

To each of these XDI compositions, 0.1% of sodium cyanide is added and the mixture is allowed to stand at 15° C. so as to see if turbidity occurs. Portions of the XDI compositions are stored in nitrogen-filled bottles to examine the solubility of each sample in 20 milliliters of toluene. The results are as follows.

| Stabilizer | Amount (percent by weight) | Gelation by sodium cyanide | Solubility in toluene after 4 weeks |
|---|---|---|---|
| This invention: | | | |
| Powdery sulfur | 0.2 | Unchanged for 4 days | Clear. |
| Hydrogen sulfide | 0.5 | do | Do. |
| Nitrourea | 0.2 | Gelation after 2 days | Slight turbidity. |
| Acetylurea | 0.2 | Gelation after 1 day | Do. |
| Barbital | 0.3 | Turbidity after 3 days | Clear. |
| Parabanic acid | 0.2 | Gelation after 2 days | Slight turbidity. |
| Dichlorisocyanuric acid | 0.01 | Unchanged for 4 days | Clear. |
| Formamide | 0.2 | do | Do. |
| Thioacetamide | 0.2 | Gelation after 2 days | Slight turbidity. |
| Trichloracetamide | 0.2 | Unchanged for 4 days | Clear. |
| Benzene sulfonamide | 0.2 | do | Do. |
| p-Toluenesulfonamide | 0.2 | do | Do. |
| Malonamide | 0.2 | do | Do. |
| Trichloroaceto-N-butylamide. | 0.2 | do | Do. |
| α-Cyanoacetamide | 0.2 | do | Do. |
| Trichloracetanilide | 0.2 | do | Do. |
| Maleinamide | 0.2 | do | Do. |
| N-butylmaleinamide | 0.2 | do | Do. |
| Trichlorthioacetamide | 0.2 | do | Do. |
| Thiobenzamide | 0.2 | Gelation after 1 day | Slight turbidity. |
| p-Toluenesulfonic-N-ethylamide. | 0.2 | Unchanged for 4 days | Clear. |
| Control: | | | |
| No stabilizer | | Gelation simultaneously | Composition itself shows turbidity in 4 days. |
| Pyrogallo | 0.2 | do | Turbidity. |
| Guaiacol | 0.2 | do | Do. |
| Triphenyl phosphite | 0.2 | do | Do. |
| Benzoyl chloride | 0.2 | Gelation after 1 day | Do. |
| Carbon dioxide | 1.0 | Gelation simultaneously | Do. |
| N,N'-dibutylthiourea | 0.2 | do | Do. |

| Stabilizer of this invention | Solubility in toluene after— | | | |
|---|---|---|---|---|
| | 1 week | 2 weeks | 3 weeks | 4 weeks |
| Formamide | Clear | Clear | Clear | Slight turbidity. |
| Acetamide | do | do | do | Do. |
| Thioacetamide | do | do | do | Do. |
| Chloracetamide | do | do | do | Clear. |
| Dichloracetamide | do | do | do | Do. |
| Trichloracetamide | do | do | do | Do. |
| Benzene sulfonamide | do | do | do | Do. |
| p-Toluenesulfonamide | do | do | do | Do. |
| Malonamide | do | do | do | Do. |
| Oxamide | do | do | do | Slight turbidity. |
| α-Cyanoacetamide | do | do | do | Clear. |
| Trichloraceto-N-butylamide. | do | do | do | Do. |
| Maleinamide | do | do | do | Do. |
| N-butylmaleinamide | do | do | do | Slight turbidity. |
| Trichlorthioacetamide | do | do | do | Clear. |
| p-Toluenesulfonic-N-ethylamide. | do | do | do | Do. |
| p-Toluenesulfonanilide | do | do | do | Do. |
| Maleinanilide | do | do | do | Do. |
| Trichloracetanilide | do | do | do | Do. |
| Control (no stabilizer) | (1) | (1) | (1) | (1). |

1 Gelation in a day.

Experiment 4

4,4' - diphenylmethane diisocyanate prepared by phosgenating p,p'-methylene-dianiline and by purifying the product is distilled. While kept at 45° C., the distillate is fractionally poured in 50 cc. clear colorless bottles each containing weighed portions of the following stabilizers.

After the air within each bottle is replaced with nitrogen gas, the bottles are each sealed and stored at 60° C. After 15 days, the samples are examined to see whether precipitates are formed and the amount of insolubles in 20 milliliters of toluene solution is measured.

The results are as follows.

| Stabilizer | Amount (percent by weight) | Precipitation | Insolubles in toluene (percent by weight) |
|---|---|---|---|
| This invention: | | | |
| Nitrourea | 0.02 | None | <0.01 |
| Trichloracetylurea | 0.02 | do | <0.01 |
| Dichloracetylurea | 0.02 | do | <0.01 |
| 1-p-toluenesulfonyl-3-phenylurea | 0.02 | do | <0.01 |
| o-Benzosulfimide | 0.02 | Slight amount | 0.01 |
| Barbital | 0.05 | do | 0.01 |
| Dichlorisocyanuric acid | 0.001 | None | <0.01 |
| Dichloracetamide | 0.02 | do | <0.01 |
| Benzenesulfonamide | 0.02 | do | <0.01 |
| p-Toluenesulfonamide | 0.02 | do | <0.01 |
| Malonamide | 0.05 | Slight amount | 0.02 |
| Control: | | | |
| No stabilizer | | Precipitates | 0.3 |
| Pyrogallol | 0.05 | do | 0.03 |
| Guaiacol | 0.05 | do | 0.05 |
| Triphenyl phosphite | 0.05 | do | 1.0 |
| Phosphorus pentachloride | 0.05 | Slight amount | 0.05 |
| Benzoyl chloride | 0.05 | do | 0.05 |
| Acetyl chloride | 0.05 | do | 0.05 |
| Phosgene | 0.05 | do | 0.07 |
| Carbon dioxide | 0.1 | Precipitates | 0.8 |
| Sulfur dioxide | 0.1 | do | 0.2 |
| N,N'-dibutylthiourea | 0.05 | do | 0.75 |

What we claim is:

1. An organic isocyanate composition containing an organic isocyanate, said composition being stabilized against polymerization and coloration by having incorporated therein 0.001 to 1.0 percent by weight based on the weight of the organic isocyanate of a stabilizer selected from the group consisting of
   (a) a substituted urea derivative of the formula:
   X—NHCONH—Y wherein X is nitro, cyano, acetyl, chlorinated acetyl, thioacetyl, toluenesulfonyl or benzenesulfonyl and Y is hydrogen, phenyl or n-butyl,
   (b) a cyclic ureide compound selected from the group consisting of parabanic acid, barbituric acid, barbital, thiobarbital, phenobarbital, uracil, 5-methyluracil, isocyanuric acid, benzyl isocyanurate, dibenzyl isocyanurate, n-butyl isocyanurate, di-n-butyl isocyanurate, chlorisocyanurate, dichlorisocyanurate, orotic acid, orotic acid ethyl ester, orotic acid phenyl ester, butanimide, phthalimide, and o-benzoic sulfimide.
   (c) a compound shown by the formulas:
   $R^1CXNHR^3$
   $R^2(CONHR^3)_2$
   or
   $(CONHR^3)_2$
   $R^4SO_2NHR^3$
   wherein X is O or S; $R^1$ and $R^3$, which may be the same or different, are alkyl groups having 1 to 4 carbon atoms, phenyl groups or hydrogen, and $R^4$ is an alkyl group having 1 to 4 carbon atoms or a phenyl group, said alkyl and phenyl groups which may be substituted by one or more chlorines, —$NO_2$, —CN, an alkyl having 1 to 2 carbon atoms or an alkoxy having 1 to 2 carbon atom; and $R^2$ is a divalent hydrocarbon residue selected from methylene, ethenylene and phenylene,
   (d) sulfur and
   (e) hydrogen sulfide.

2. A composition as claimed in claim 1, wherein the organic isocyanate is m- or p-dimethylbenzene-ω,ω'-diisocyanate or a mixture of the m-isomer and the p-isomer.

3. A composition as claimed in claim 1, wherein the member is 1-p-toluenesulfonyl-3-phenyl urea.

4. A composition as claimed in claim 1, wherein the stabilizer is o-benzoicsulfimide.

5. A composition as claimed in claim 1, wherein the stabilizer is chloracetamide.

6. A composition as claimed in claim 1, wherein the stabilizer is dichloracetamide.

7. A composition as claimed in claim 1, wherein the stabilizer is trichloracetamide.

8. A composition as claimed in claim 1, wherein the stabilizer is α-cyanoacetamide.

9. A composition as claimed in claim 1, wherein the stabilizer is malonamide.

10. A composition as claimed in claim 1, wherein the stabilizer is maleinamide.

11. A composition as claimed in claim 1, wherein the stabilizer is oxamide.

12. A composition as claimed in claim 1, wherein the stabilizer is benzenesulfonamide.

13. A composition as claimed in claim 1, wherein the stabilizer is o- or p-toluenesulfonamide.

14. A composition as claimed in claim 1, wherein the stabilizer is p-toluenesulfon-N-ethyl amide.

15. A composition as claimed in claim 1, wherein the amount is from 0.03 to 0.2% by weight.

References Cited
UNITED STATES PATENTS

| | | | |
|---|---|---|---|
| 2,885,421 | 5/1959 | Spiegler | 260—453 |
| 2,885,425 | 5/1959 | Spiegler | 260—453 |
| 2,885,426 | 5/1959 | Spiegler | 260—453 |
| 3,226,412 | 12/1965 | Smith | 260—453 |
| 3,226,413 | 12/1965 | Smith | 260—453 |
| 3,226,414 | 12/1965 | Smith | 260—453 |
| 3,281,446 | 10/1966 | Manning | 260—453 |
| 3,330,849 | 7/1967 | Ulrich | 260—453 |

JOSEPH REBOLD, Primary Examiner

D. H. TORRENCE, Assistant Examiner